L. J. BERG.
CLASP BRAKE FOR RAILWAY TRUCKS.
APPLICATION FILED OCT. 26, 1912.
1,087,100.
Patented Feb. 17, 1914.
2 SHEETS—SHEET 1.
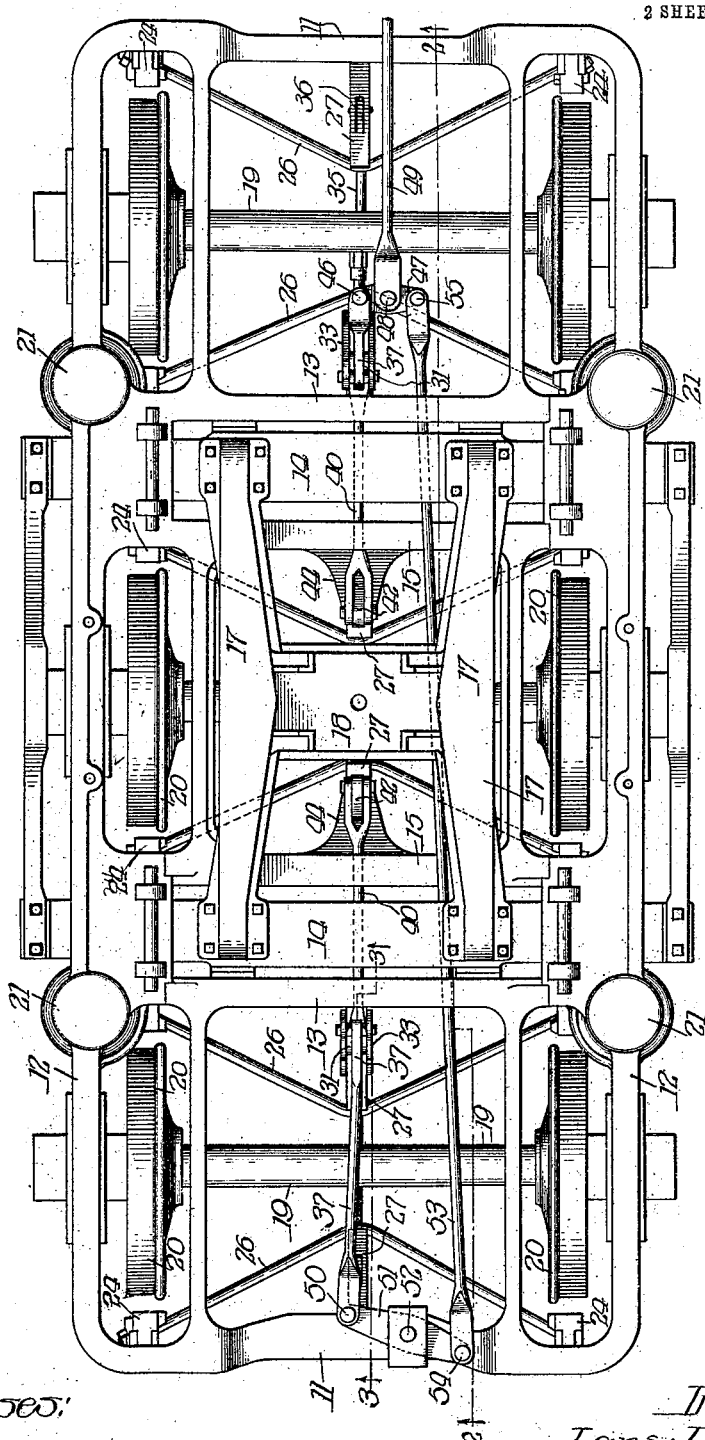
Inventor:
Lars J. Berg

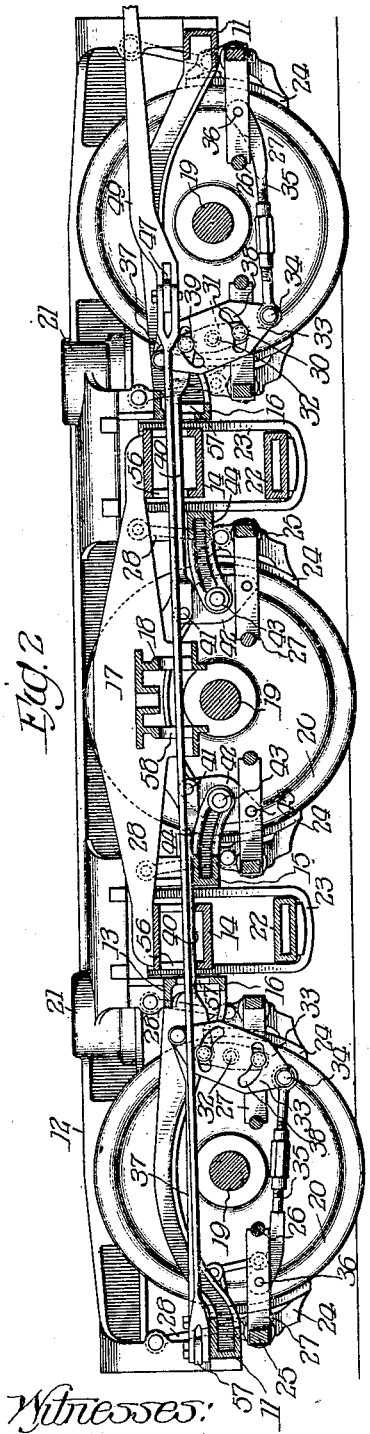
L. J. BERG.
CLASP BRAKE FOR RAILWAY TRUCKS.
APPLICATION FILED OCT. 26, 1912.
1,087,100. Patented Feb. 17, 1914.
2 SHEETS—SHEET 2.

UNITED STATES PATENT OFFICE.

LARS J. BERG, OF CHICAGO, ILLINOIS.

CLASP-BRAKE FOR RAILWAY-TRUCKS.

1,087,100.  Specification of Letters Patent.  Patented Feb. 17, 1914.

Application filed October 26, 1912. Serial No. 727,845.

*To all whom it may concern:*

Be it known that I, LARS J. BERG, a citizen of the United States, residing at Chicago, in the county of Cook and State of Illinois, have invented certain new and useful Improvements in Clasp-Brakes for Railway-Trucks, of which the following is a specification.

This invention relates to brakes for railway cars and particularly to the mounting of brakes and their operating mechanism upon six-wheel trucks, a pair of trucks to each wheel.

In six-wheel trucks of the Pullman type it has heretofore been inconvenient, if not impossible, to employ two brake shoes for each wheel for the reason that the various parts of the truck structure interfered with the mounting of the brake shoes in such manner as to be readily accessible for adjustment and replacement, and also interfered with the mounting of the mechanism for readily and effectively operating simultaneously and uniformly the twelve brake shoes necessitated in such equipment of six-wheel trucks.

By the employment of substantially straight equalizing bars and the housing of the equalizing springs in recesses of the truck frame, which invention forms the subject matter of a separate patent application, I have made possible the use of a pair of brake shoes acting upon each wheel of a six-wheel truck; and the present application has to do with the form, construction and arrangement of the truck structure and brake operating mechanism whereby the twelve brake shoes of such a truck may be manipulated in a most practical and efficient manner.

In order that those skilled in the art may have a full and complete understanding of the features of construction embodying this invention, I have illustrated in the accompanying drawings, forming a part of this specification, a preferred embodiment of the invention.

In these drawings, Figure 1 is a top plan view of a six-wheel truck of the Pullman type equipped with my invention; Fig. 2 is a vertical longitudinal section taken on the line 2—2 of Fig. 1; Fig. 3 is a vertical section taken on the line 3—3 of Fig. 1 with certain parts broken away, and Fig. 4 is a fragmentary view showing the middle wheel of the truck upon the same line as Fig. 2, but with certain modifications as to structure.

As is customary in constructions of this general character the truck frame comprises the end pieces 11, 11, the wheel pieces, 12, 12, the transom tie bars 13, 13, and associated with the pair of truck bolsters 14, 14, the middle transoms 15, 15, and the outer transoms 16, 16, the truck bolsters supporting the center bearing arch bars 17, 17 between which is arranged the truck center plate 18.

The three axles 19 are each equipped with a pair of wheels 20, 20, the ends of the axles being mounted in the usual manner in journal boxes, not shown, the space between the journal boxes on one side of the truck being bridged by substantially straight equalizing bars between which and the wheel piece are disposed equalizing springs seated above in the spring caps 21. Truck bolsters 14 are supported in the usual manner upon bolster springs mounted in the usual manner upon spring planks 22 hung within the swing hangers 23, the bolster springs being omitted from the drawings for purposes of clearness. Each of the wheels 20 is equipped with a pair of brake shoes 24, 24 carried by brake beams 25 including the truss rods 26 and struts 27, the brake shoes being suspended from the truck frame by means of the brake hangers 28 in the usual manner.

The struts 27 of the two brake beams adjacent the inside of the outer wheels of the truck are slotted as indicated at 29 and have pivoted therein at 30 one arm of a lever 31. This lever is fulcrumed in its medial portion at 32 between a pair of floating levers 33, the lower ends of which are pivotally connected at 34 to a tie rod 35 pivoted at 36 to the strut of the outermost brake beams arranged exterior to the outer wheels, while to the upper ends of each of these levers 33 is connected an operating link 37 extending toward the end of the truck. The floating levers 33 are provided with segmental slots 38 within which play respectively the pivot pin 30 of the lever 31 and the pivot pin 39 by which the free end of the lever 31 is connected to a link 40 extending therefrom toward the center of the truck. The connecting links 40 have their other ends pivoted at 41 to levers 42 fulcrumed at 43 on the brackets 44 of the transom 15, the opposite arm of each of the levers 42 being pivoted at 45 within the struts 27 of the brake beams associated with the middle wheel.

That operating link 37 disposed at the right hand end of the truck, as shown in the drawings, is pivoted at 46 to a lever 47 fulcrumed in its middle portion at 48 upon the end of the tension rod 49 leading from pneumatic or other suitable operating mechanism which member 49 may for convenience be designated as a brake rod. That operating link 37 at the left hand end of the truck is pivoted at 50 to one end of a lever 51 fulcrumed at 52 upon the truck frame. A connecting rod 53 is secured to the other end of the lever 51 at 54 and to the corresponding end of the lever 47 at 55.

In order to accommodate the connecting links 40 and the connecting rod 53, the truck bolsters 14 and the transoms 15 and 16 are apertured at 56 and 57 and the said links and rod extend therethrough, the truck center plate being likewise apertured at 58 to accommodate the connecting rod. Preferably the apertures in these parts are elongated vertically to form slots in order to provide for vertical movement of the parts in use.

From the foregoing description, taken in connection with the drawings, the operation will be seen to be as follows: Assuming that tension is applied to the brake rod 49, the fulcrum 48 and the lever 47 will be moved bodily to the right together with the connecting rod 53 and the operating link 37 at the right hand end of the truck, while at the left hand end of the truck the movement of the connecting rod 53 to the right will be transmitted by the lever 51 to the operating link 37 causing the same to move in the opposite direction. As the operating mechanism for the two halves of the truck are duplicates one of the other the movement of the parts connected to the respective operating links 37, 37 will be the same.

Referring to the mechanism at the right hand end of the truck, as the link 37 moves to the right the upper end of the floating lever 33 will be likewise moved to the right upon its fulcrum 32, the lower end of the lever 33 moving to the left and drawing therewith by means of the tie rod 35 the brake shoe 24 on the outside of its wheel. The resistance offered by the brake shoe 24 and tie rod 35 to the movement of the lower end of the lever 33 will cause the floating fulcrum 32 of said lever and with it the lever 31 to move to the right, the lever 33 tilting upon the pivot 34 as a fulcrum and the lever 31 moving bodily to the right. The lower end of the lever 31 being pivoted to the strut of the brake beam such pivot 30 acts as a fulcrum for said lever upon which its upper end moves to the right, such movement being transmitted by means of the connecting link 40 to the lever 42, the lower end of which is connected to the brake beam mounted on the right hand side of the middle wheel, and by the resultant movement of the lever 42 the brake shoe is applied to the middle wheel. As before stated identically the same action takes place at the left hand end of the truck so that the twelve brake shoes of the truck are applied simultaneously and uniformly to their several wheels.

In Fig. 4 a slightly modified arrangement is shown in connection with the middle wheel. In this form of construction the levers 42, 42 instead of having a fixed fulcrum, as in the former case, are fulcrumed at 59 upon opposite ends of a fulcrum bar 60 which serves to further equalize the pressure of the two brake shoes operating upon said wheel.

While I have herein illustrated and described with a considerable degree of particularity one embodiment of the invention it will be apparent to those skilled in the art that the same is susceptible of a variety of modifications without departure from the essence of the invention and without the material sacrifice of its substantial benefits and advantages.

I claim:

1. In a railway car-truck, the combination of a car-wheel, a pair of brake-beams, brake-shoes on said beams adapted to engage opposite sides of the periphery of the wheel, a lever connected to one of said brake-beams, a floating lever fulcrumed on said first lever, a connection between said floating-lever and the other brake-beam, and means to operate said floating-lever whereby to cause the brake shoes of both brake-beams to grasp the wheel, substantially as described.

2. In a railway car-truck, the combination of a pair of car-wheels, three brake-beams, a brake-shoe on each of said beams, the shoes on a pair of said beams being adapted to engage opposite sides of the periphery of one of said wheels, the shoe on the third brake-beam being adapted to engage the other wheel, a lever connected to one of the brake-beams of said pair, a floating lever fulcrumed on said first lever, a connection between said floating-lever and the other brake-beam of the pair, a connection between said first lever and the third brake-beam, and means to operate said floating lever whereby to cause the pair of brake-shoes to grasp one wheel and the third brake-shoe to coact with the other wheel, substantially as described.

3. In a six-wheel railway car-truck, the combination of three pairs of car-wheels, the wheels of each pair being at opposite sides of the truck, a pair of brake-beams for each pair of end wheels, a pair of brake-shoes on each of said brake-beams providing two brake-shoes for each of the four end wheels, a pair of brake-beams for the middle pair of wheels of the truck, a pair of brake-shoes on each of said brake-beams providing two brake-shoes for each of the middle wheels of the truck, operating-means associating together the brake-beams of one pair of end wheels and one of the brake-beams of the middle-wheel, an operating means for the other pair of brake-beams for the end wheels and the other brake-beam of the middle pair of wheels comprising a brake rod, a lever fulcrumed thereon and having one arm connected to the first mentioned operating means, a second lever with a fixed fulcrum and having one arm connected to the second mentioned operating means, and a connecting rod connecting the other ends of said levers, substantially as described.

4. In a six-wheel railway car truck, the combination of three pairs of car wheels, the wheels of each pair being at opposite sides of the truck, a pair of brake-beams for each pair of end wheels, a pair of brake shoes on each of said brake beams providing two brake shoes for each of the four end wheels, a pair of brake beams for the middle pair of wheels of the truck, a pair of brake shoes on each of said brake beams providing two brake shoes for each of the middle wheels of the truck, a first lever connected to one of the pair of brake beams for an end wheel, a floating lever fulcrumed on the first lever, a connection between said floating lever and the other brake beam of the pair, a connection between said first lever and one of the brake beams for the middle wheel, and means to operate said floating lever whereby cause the pair of brake shoes to grasp one end wheel and the third brake shoe to coact with one side of the middle wheel, a like operating means for the remaining brake beams and shoes and a connection between said operating means associated with the levers of the two ends of the truck whereby all of the brake shoes of the truck are simultaneously applied to all the wheels, substantially as described.

5. In a railway car-truck, the combination with car wheels, a truck-frame and a movable bolster, of a brake-shoe and operating mechanism located at one side of the bolster, a second brake shoe and operating mechanism located at the opposite side of the bolster, and a rod connecting said operating mechanisms, the points of connection of said rod with said operating mechanisms being on opposite sides of and substantially on a level with the bolster, the latter being apertured for the accommodation of said rod, substantially as described.

6. In a railway car-truck, the combination with car wheels, a truck-frame, and a movable bolster, of a brake-shoe and operating mechanism located at one side of the bolster, a second brake shoe and operating mechanism at the opposite side of the bolster, and a rod connecting said operating mechanisms, the points of connection of said rod with said operating mechanisms being on opposite sides of and substantially on a level with the bolster and parts of the truck-frame, the bolster and said parts of the truck-frame being apertured for the accommodation of said rod, substantially as described.

7. The combination with car wheels and a car truck having a bolster, a transom, and a truck-center plate, of a brake shoe and operating mechanism at one side of the bolster, transom and truck center-plate, a second brake shoe and operating mechanism at the opposite side of said bolster, transom and truck center-plate, and a rod connecting said operating mechanisms, the points of connection of said rod with said operating mechanisms being on opposite sides of and substantially on a level with the bolster, transom and truck center-plate, said bolster, transom and truck center-plate being provided with apertures alined longitudinally of the truck and receiving the rod, substantially as described.

8. The combination with car wheels and a car-truck having a truck center-plate, and bolsters and transoms at opposite sides of the center-plate, of a brake shoe and operating mechanism at one end of the truck, a second brake shoe and operating mechanism at the opposite end of the truck, and a rod connecting said operating mechanisms, the points of connection of said rod with said operating mechanisms being on opposite sides of and substantially on a level with the transoms, bolsters and truck center-plate, said truck center-plate, bolsters and transoms having apertures alined longitudinally of the truck and receiving the said rod, substantially as described.

LARS J. BERG.

Witnesses:
ALVAREY A. BARNES,
LUTHER JOHNS.